Mar. 6, 1923.
J. F. O'CONNOR.
FRICTION SHOCK ABSORBING MECHANISM.
FILED DEC. 27, 1920.
1,447,424.
2 SHEETS—SHEET 1.
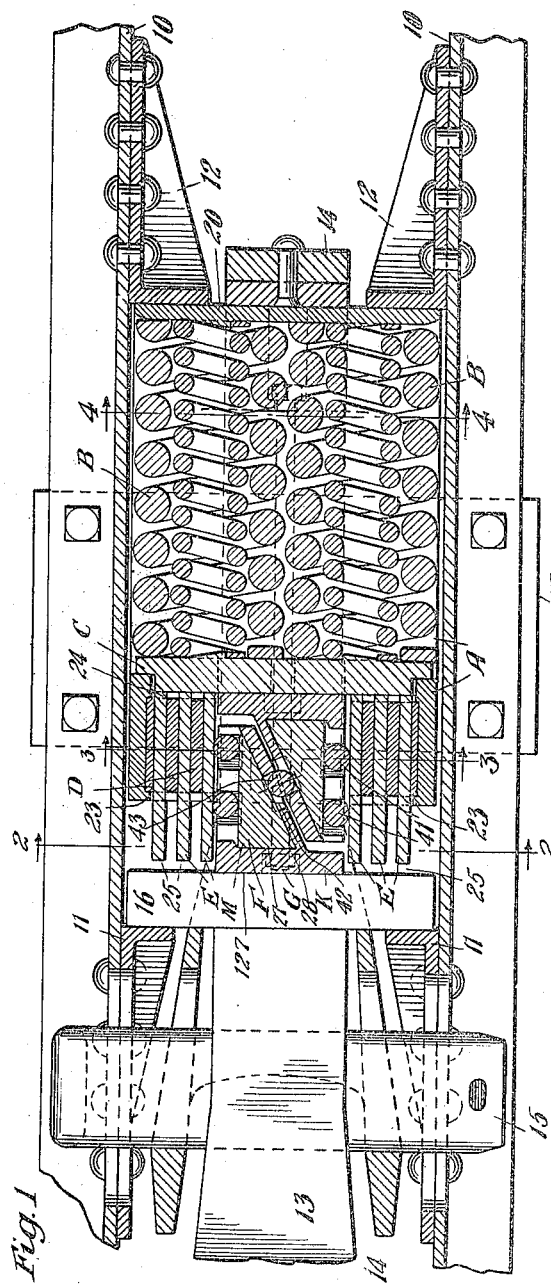
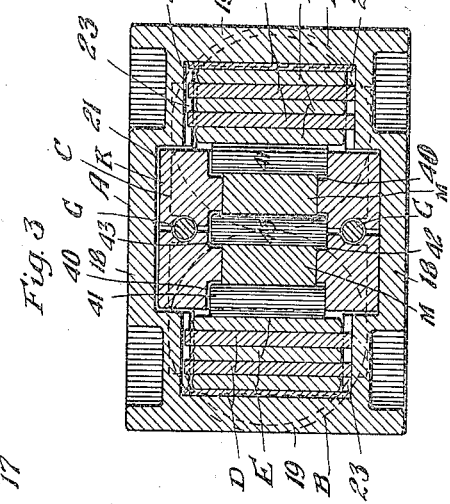
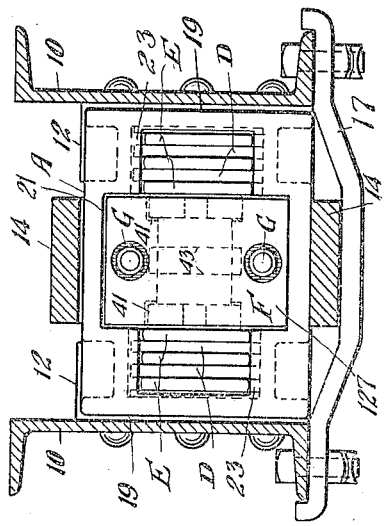
Witnesses
Wm. Geiger
Inventor
John F. O'Connor
By Geo. I. Haight
His Atty.

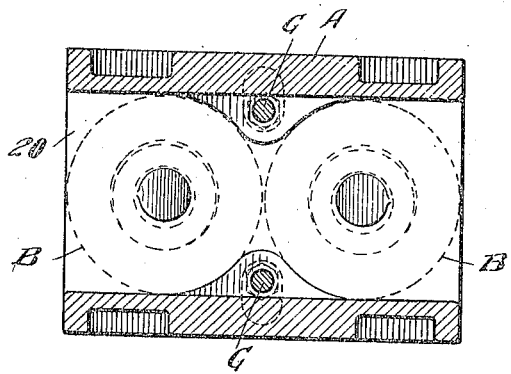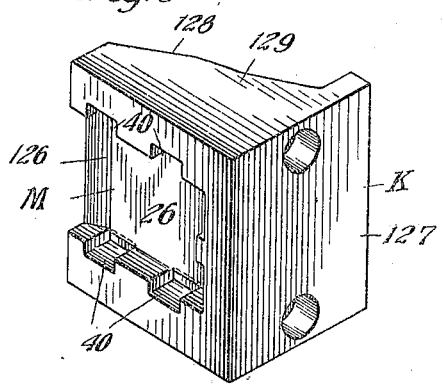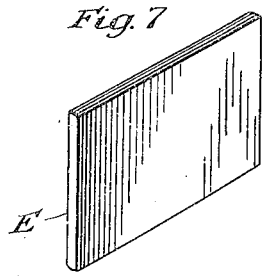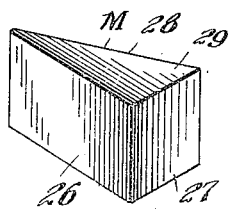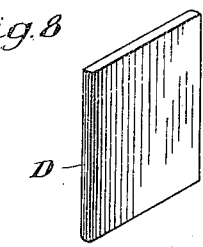

Patented Mar. 6, 1923.

1,447,424

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

Application filed December 27, 1920. Serial No. 433,185.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism especially adapted for railway draft riggings and wherein is obtained high capacity by the employment of intercalated stationary and movable friction plates, thus providing large wearing areas, the friction plates being combined with a pressure and spreading device of true anti-frictional character to insure release.

Another object of the invention is to provide a novel type of wedge construction whereby accurate and efficient results are obtainable at comparatively small expense.

Other objects of the invention will more clearly appear from the description and claims hereinafter following.

In the drawings forming a part of this specification, Figure 1 is a horizontal longitudinal sectional view of a portion of a railway draft rigging showing my improvements in connection therewith. Figure 2 is a vertical transverse sectional view corresponding substantially to the line 2—2 of Figure 1. Figures 3 and 4 are vertical transverse sectional views of the shock absorbing mechanism proper corresponding to the lines 3—3 and 4—4 respectively of Figure 1. Figures 5 and 6 are detail perspectives of two elements of the wedge device. And Figures 7 and 8 are detail perspectives of the movable and stationary friction plates, respectively.

In said drawings, 10—10 denote channel draft sills of a railway car to the inner faces of which are secured front stop lugs 11 and rear stop lugs 12. A portion of a drawbar is indicated at 13, the same being operatively associated with the shock absorbing mechanism proper by a hooded cast yoke 14 and coupler key 15. The shock absorbing mechanism proper is disposed within the yoke 14 as is also a front follower 16. The yoke and parts therein are adapted to be supported in operative position by a detachable saddle plate 17.

The improved shock absorbing mechanism proper, as shown, comprises, broadly a heavy combined friction shell and spring cage casting A; a main spring resistance B; a spring follower C; a series of stationary friction plates D; a series of movable friction plates E; a wedging device indicated broadly by the reference character F; and connecting or retaining bolts G—G.

The casting A is of generally rectangular outline in cross section as clearly indicated in Figures 2 and 3 and has what may be termed a cage or shell at the forward end thereof, said cage having upper and lower walls 18—18 and side walls 19—19. The upper and lower walls 18 are extended to the rear of the casting A where they are connected by a vertical rear wall 20 which cooperates with the lugs 12 as a rear follower. The casting A is open on its sides as shown in Figure 1 so as to permit insertion of the follower C and the twin arranged springs B—B.

The shell of the casting A is interiorly formed as best indicated in Figures 3 where it will be noted that at the center as indicated at 21, the vertical height is appreciably greater than it is on either side thereof as indicated at 22—22. In the case of each of the side portions 22, transversely extending shoulders 23—23 are provided at the front and rear ends of the recesses 22 so as to form guides for the lateral insertion of the stationary friction plates D and also to prevent the latter from moving longitudinally or lengthwise of the shock absorbing mechanism proper. As will be understood from the foregoing, the plates D have freedom of movement laterally so as to create friction with the alternated intercalated movable friction plates E.

Said movable friction plates E are of greater length taken parallel to the center line of draft, than the stationary plates D. The rear edges of said plates E as indicated at 24 in Figure 1 are normally extended slightly inwardly of the rear edges of the stationary plates D so as to thereby engage the spring follower C. At their forward edges, the plates E are extended close to the front follower 16 with normally a slight space therebetween as indicated at 25.

The wedging device F, as shown, consists of two like units oppositely arranged. Each of said units consists of a cage K as shown in Figure 5 and an interior block or core M as shown in Figure 6. The block or core M is of regular wedge formation having an outer flat surface 26 adapted to extend parallel to the axis of the mechanism, a flat end face 27, a face 28 inclined with respect to the face 26, and upper and lower parallel faces 29—29. It will be observed that the block M is of such form that it may be easily manufactured of any desired material as for instance in the form of a forged high carbon steel element, the same being free from any unusual projections or ribs such as are common in many types of wedges employed in shock absorbing mechanisms.

Each case or roll retainer K has an end wall 127, top and bottom walls 129—129 and an inclined wall 128. On the side of the cage or roll retainer K corresponding to the face 26 of the block M, the cage K is open as indicated at 126 so as to thereby permit easy insertion of the core or block M therewithin. On the side having the opening 126, the cage K is formed with cooperating sets of transversely extending grooves 40—40 adapted to accommodate a pair of anti-friction rollers 41—41. On its inclined wall 128, the cage K is slotted as indicated at 42 in Figure 1 to thereby accommodate another anti-friction roller 43.

As will be clearly seen from an inspection of Figure 1, the core or block M, corresponding cage K, and anti-friction rollers, are so made that the rollers, while bearing upon the respective flat faces 26 and 28 of the core M, will nevertheless extend outside of the adjacent exterior surfaces of the cage K so as to thereby permit the anti-friction rollers to cooperate with other members and relieve the cage K of all crushing pressure. Because of this arrangement, the cage K may be made as a malleable casting and does not require any difficult or expensive finishing operations. It will be noted that the slots 40 and openings 42 are of sufficient length to permit a true rolling movement of the rollers 41 and 43 but will nevertheless limit the latter within certain limitations of movement. As clearly shown in Fig. 1, the anti-friction roller 43 is interposed between the blocks M and engages the opposed flat wedge faces midway between the front and rear ends thereof, thereby forming a fulcrum on which the blocks M may rock relatively to each other. By referring to Figures 1 and 3, it will be seen that the anti-friction rollers 41 on the outer sides of the wedge mechanism engage movable friction plates E. The outer transverse wall 127 of one wedge unit is directly engaged by the front follower 16 and the corresponding inner end wall 127 of the other friction unit directly bears upon the spring follower C.

The retainer bolts G are suitably connected to the rear end of the casing A and at their forward ends pass thru suitable recesses provided in the wedge units and are connected to the outer one thereof by suitable nuts as indicated in Figure 1. As will be understood by those skilled in the art, the bolts G not only serve to maintain the parts properly assembled but also permit of placing the springs under an initial compression, if desired.

The operation is as follows, assuming an inward or buffing movement of the drawbar. As the drawbar is forced inwardly, the follower 16 will receive a like movement thereby transmitting pressure directly to the outer wedge unit. Pressure from the latter will be transmitted thru the other wedge unit to the follower C the resistance afforded by the springs B. Due to the true anti-friction engagement between the wedge device and the friction plates, the wedge device will be accelerated or advanced longitudinally with respect to the friction plates until such time as the follower 16 engages the outer edges of the movable friction plates E. At this time, the inner spring follower C will have left engagement with the inner edges of the plates E. Continued inward movement of the drawbar will produce corresponding movement of the two followers 16 and C, the wedging device, and the plates E. As will be understood from the preceding description considered in connection with the drawings, the wedge pressure exerted laterally on the plates will gradually increase in accordance with the increase of spring resistance, as the compression stroke is continued. Upon removal of the actuating force, the reaction of the springs B is exerted thru the follower C thus projecting the wedge device as an entirety outwardly relatively to the friction plates during the initial portion of or initiation of the release action. At this point it will be noted that not only is there a true anti-friction relation between the two units of the wedge device but a true anti-friction relation between each unit and corresponding movable friction plate which I consider of importance in a friction shock absorbing mechanism of the general character disclosed, for the reason, broadly, that all of the friction plates, stationary and movable, are relieved at the beginning of the release action, of the high degree of lateral pressure that has been set up during the compression stroke. It will also be evident, that by providing a single roller 43, centrally disposed between the two units of the wedge device, on which the latter may fulcrum or pivot relatively to each other, relative adjustment of the units will be permitted so that the same may accommodate themselves to deviations from parallelism of the opposed faces of the innermost friction plates. This is of importance in a mechanism of the type herein disclosed, including a plurality of stationary and movable friction plates, as it frequently happens, due to the inherent inaccuracies of the plates resulting from their method of manufacture, that one or more of the plates are of slightly varying thickness from the front to the rear ends thereof, thereby causing the innermost plates of the groups of plates to deviate from parallelism when the plates are pressed into face to face contact. By providing a wedge member composed of two units between which a fulcruming or pivotal action is permitted, as described, the intercalated plates of either group are permitted to assume true surface contact with each other, even though there may be a change of thickness of one or more of the plates of that group between the front and rear end thereof. After the initial outward movement of the wedge device, the follower C will engage the inner edges of the movable plates E at which time the lateral pressure will have been reduced as above set forth against the intercalated friction plates so that continued expansion of the springs B will easily force the movable plates E to their outermost normal position.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with a cage; of intercalated, relatively stationary and movable friction plates carried by said cage, said intercalated plates being divided into two separate groups; a spring resistance; a pressure-transmitting wedging device interposed between said two groups of plates, said device including an inner wedge unit adapted to be yieldingly resisted by said spring resistance, an outer wedge unit adapted to receive actuating pressure, and a single fulcrum-functioning anti-friction roller interposed between said two units.

2. In a friction shock absorbing mechanism, the combination with a cage; of intercalated, relatively stationary and movable friction plates carried by said cage, said intercalated plates being divided into two separate groups; a spring resistance; a pressure-transmitting wedging device interposed between said two groups of plates, said device including an inner wedge unit adapted to be yieldingly resisted by said spring resistance, an outer wedge unit adapted to receive actuating pressure, and a single traveling fulcrum-functioning element interposed between said two units.

3. In a friction shock absorbing mechanism, the combination with a cage; of intercalated, relatively stationary and movable friction plates carried by said cage, said intercalated plates being divided into two separate groups; a spring resistance; a pressure-transmitting wedging device interposed between said two groups of plates, said device including an inner wedge unit adapted to be yieldingly resisted by said spring resistance, an outer wedge unit adapted to receive actuating pressure, said wedge units having co-acting opposed surfaces, and a spacing support interposed between said two units, said support having fulcrum faces engaging said opposed wedge surfaces to permit a relative rocking movement of the wedge units.

4. In a friction shock absorbing mechanism, the combination with a cage; of intercalated, relatively stationary and movable friction plates carried by said cage, said intercalated plates being divided into two separate groups; a spring resistance; a pressure-transmitting wedging device interposed between said two groups of plates, said device including an inner wedge unit adapted to be yieldingly resisted by said spring resistance, an outer wedge unit adapted to receive actuating pressure, and a single traveling supporting fulcrum member interposed between said two units, to permit a relative rocking movement of the wedge units.

5. As an article of manufacture, a wedge unit consisting of an inner core and an enclosing separate casing, said core being of triangular shape with two flat surfaces converged to provide a wedge formation, said casing substantially enveloping said core and provided with an opening to permit insertion and removal of said core, said casing on the sides thereof corresponding to said two flat converging faces of the core, being provided with recesses to accommodate anti-friction rollers adapted to bear on one side against said core and at their outer sides against cooperating members spaced from the unit.

6. As an article of manufacture, a wedging unit comprising: an inner wedge-shaped core; and an enveloping separate casing having an opening at one side arranged to permit insertion and removal of said core, the remaining sides of said casing being provided with walls arranged to correspond with the contour of the wedge-shaped core, each of said walls engaging a face of the wedge and one of said walls being provided with a shoulder for engagement with the face of the wedge at the open side of the casing, said walls and shoulder acting to support said wedge against movement relative to said casing, said casing being also provided with recesses to accommodate anti-friction rollers.

7. As an article of manufacture, a wedging unit comprising: an inner-wedge-shaped core; and an enveloping separate casing having core engaging bottom, top and side walls and an opening at one side arranged to permit insertion and removal of said core, one of said side walls being provided with a wedge confining shoulder, said casing being provided with recesses to accommodate anti-friction rollers.

8. As an article of manufacture, a wedging unit comprising: an enveloping casing having an opening at one side, the walls of said casing at said open side being provided with recesses to accommodate anti-friction rollers adapted to extend across said opening and a separate core having flat wedge surfaces snugly fitted within said casing, said core being adapted to be inserted and removed through said opening.

9. As an article of manufacture, a wedging unit comprising: a wedge-shaped core having flat wedge surfaces; and a core enclosing casing having a plurality of wedge-engaging walls, and an opening through which the core may be inserted into and removed from said casing, said casing snugly fitting said core walls to prevent relative movement between the core and the casing, said casing having roller-receiving recesses adjacent said flat wedging surfaces of said core.

In witness that I claim the foregoing I have hereunto subscribed my name this 21st day of Dec., 1920.

JOHN F. O'CONNOR.

Witness:
　CARRIE GAILING.